US010598785B2

(12) United States Patent
Khial et al.

(10) Patent No.: US 10,598,785 B2
(45) Date of Patent: Mar. 24, 2020

(54) HYBRID TRANSMITTER RECEIVER OPTICAL IMAGING SYSTEM

(71) Applicant: California Institute of Technology, Pasadena, CA (US)

(72) Inventors: Parham Porsandeh Khial, Pasadena, CA (US); Aroutin Khachaturian, Glendale, CA (US); Seyed Ali Hajimiri, La Canada, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 318 days.

(21) Appl. No.: 15/431,617

(22) Filed: Feb. 13, 2017

(65) Prior Publication Data

US 2017/0234984 A1    Aug. 17, 2017

Related U.S. Application Data

(60) Provisional application No. 62/294,176, filed on Feb. 11, 2016.

(51) Int. Cl.
| | | |
|---|---|---|
| *G01S 17/42* | (2006.01) | |
| *G01S 7/486* | (2020.01) | |
| *G01S 7/481* | (2006.01) | |
| *G01S 7/484* | (2006.01) | |
| *G01S 17/10* | (2020.01) | |

(52) U.S. Cl.
CPC ............. *G01S 17/42* (2013.01); *G01S 7/484* (2013.01); *G01S 7/486* (2013.01); *G01S 7/4817* (2013.01); *G01S 17/10* (2013.01)

(58) Field of Classification Search
CPC ........ G01S 17/42; G01S 7/4817; G01S 7/484; G01S 7/486; G01S 2013/0245; G01S 2013/0254; G01S 2013/0263
See application file for complete search history.

(56) References Cited

U.S. PATENT DOCUMENTS

| | | | | |
|---|---|---|---|---|
| 5,106,192 | A  * | 4/1992 | Tucker .................. | G01S 17/325 356/477 |
| 5,751,242 | A  * | 5/1998 | Goutzoulis ............. | G01S 7/032 342/157 |
| 7,315,276 | B1 * | 1/2008 | Rihaczek .............. | G01S 13/426 342/108 |
| 2006/0220946 | A1* | 10/2006 | Nohmi ...................... | G01S 7/35 342/107 |
| 2009/0033556 | A1* | 2/2009 | Stickley ................ | G01S 13/003 342/374 |

(Continued)

*Primary Examiner* — Eric L Bolda
(74) *Attorney, Agent, or Firm* — Alston & Bird LLP

(57) ABSTRACT

An image capture device includes, in part, N optical transmit antennas forming a first array, N phase modulators each associated with and adapted to control a phase of a different one of the transmit antennas, M optical receive antennas forming a second array, M phase modulators each associated with and adapted to control a phase of a different one of the receive antennas, and a controller adapted to control phases of the first and second plurality of phase modulators to capture an image of an object. The first and second arrays may be one-dimensional arrays positioned substantially orthogonal to one another. Optionally, the first array is a circular array of transmitters, and the second array is a one-dimensional array of receivers positioned in the same plane as that in which the circular array of the transmitters is disposed.

16 Claims, 6 Drawing Sheets

(56) References Cited

U.S. PATENT DOCUMENTS

| | | | | |
|---|---|---|---|---|
| 2010/0187442 A1* | 7/2010 | Hochberg | ............ | G01S 7/4814 |
| | | | | 250/492.1 |
| 2012/0092211 A1* | 4/2012 | Hampel | .................... | G01S 3/74 |
| | | | | 342/175 |
| 2016/0139266 A1* | 5/2016 | Montoya | ................. | G01S 17/32 |
| | | | | 356/5.01 |
| 2016/0320475 A1* | 11/2016 | Kellar | ..................... | G01S 13/42 |
| 2017/0184450 A1* | 6/2017 | Doylend | ............... | G01J 1/4228 |
| 2017/0357142 A1* | 12/2017 | Spector | ................. | G02B 7/021 |

* cited by examiner

HYBRID TRANSMITTER RECEIVER OPTICAL IMAGING SYSTEM

CROSS-REFERENCES TO RELATED APPLICATIONS

The present application claims benefit under 35 USC 119 (e) of U.S. provisional application No. 62/294,176, filed Feb. 11, 2016, entitled " Hybrid Transmitter Receiver Optical Imaging System", the content of which is incorporated herein by reference in its entirety.

BACKGROUND OF THE INVENTION

RF and mm-wave phased arrays are widely used in a variety of applications, such as communication, beam steering, astonomy and radar. Optical phased arrays have also been used. However, a need continues to exist for a mobile imaging systemt that uses optical phased arrays.

BRIEF SUMMARY OF THE INVENTION

An image capturing device, in accordance with one embodiment of the present invention includes, in part, N optical transmit antennas forming a first array wherein N is an integer, N phase modulators each associated with and adapted to control a phase of a different one of the transmit antennas, M optical receive antennas forming a second array wherein M is an integer, M phase modulators each associated with and adapted to control a phase of a different one of the receive antennas, and a controller adapted to control phases of the first and second plurality of phase modulators to capture an image of an object. In one embodiment, the first and second arrays are orthogonal to one another when viewed in Cartesian plane. In another embodiment, the first array is a circular array of transmitters, and the second array is a line array of receivers positioned in the same plane as the plane in which the circular array of transmitters is disposed.

In one embodiment, the image capture device further includes, in part, an optical splitter adapted to split the received coherent optical signal into N optical signals and deliver the N optical signals to the N phase modulators. In one embodiment, the image capture device further includes, in part, an optical signal combiner adapted to combine M optical signals received from M receive antennas to generate a combined received optical signal. In one embodiment, the image capture device further includes, in part, a detector adapted to detect whether the combined received optical signal represents an image of one or more points of the object. In one embodiment, the detector is adapted to supply its output to the controller. In one embodiment, the coherent optical signal is laser. In one embodiment, the M mixers are disposed between the M transmit antennas and the combiner. In one embodiment, M and N are equal. In one embodiment, the coherent optical signal supplies a reference signal to the M mixers.

A method of forming an image of an object, in accordance with one embodiment of the present invention, includes, in part, transmitting N optical signals from N transmit antennas positioned along a first array to the object, modulating phases of the N transmit antennas via a first N phase modulators and in accordance with a first control information received from a controller, receiving reflection of the N optical signals off the object via M optical receive antennas forming a second array, and modulating phases of the M optical receive antennas via a second M phase modulators and in accordance with a second control information received from the controller. In one embodiment, the first and second arrays are orthogonal to one another when viewed in Cartesian plane. In another embodiment, the first array is a circular array of transmitters, and the second array is a line array of receivers positioned in the same plane as the plane in which the circular array of transmitters is disposed.

The method, in accordance with one embodiment, further includes, in part, splitting a coherent optical signal received from an optical source into N optical signals, and delivering the N optical signals to the N phase modulators. The method, in accordance with one embodiment, further includes, in part, combining the M optical signals received from the M receive antennas to generate a combined received optical signal. The method, in accordance with one embodiment, further includes, in part, detecting whether the combined received optical signal represents an image of one or more points of the object.

The method, in accordance with one embodiment, further includes, in part, supplying to the controller a signal representative of whether the combined received optical signal represents an image of one or more points of the object. The method, in accordance with one embodiment, further includes, in part, converting a frequency of M optical signals received by the M receive antennas. The method, in accordance with one embodiment, further includes, in part, converting the frequency of M optical signals in accordance with a reference signal supplied by the coherent optical signal. In one embodiment, the coherent optical signal is laser. In one embodiment, M is equal to N

DETAILED DESCRIPTION OF THE INVENTION

An image capture device, in accordance with one embodiment of the present invention, includes an array of phased array transmit elements (alternatively referred to herein as phased array transmitter) transmitting optical signals to an object whose image is being captured, and an array of phased array receive elements (alternatively referred to herein as phased array transmitter) receiving the optical signals reflected from the object. The phased array transmitter has a far field pattern defined by a 2-dimensional Fourier Transform of the phased array transmit elements. Similarly, the phased array receiver has a far field pattern defined by a 2-dimensional Fourier Transform of the phased array receive elements. Embodiments of the present invention are adapted to capture and form an image of an object when the far field Fourier Transform patterns of the phased array transmitter and phased array receive interest one another at only one point. In one embodiment, the phased array transmit elements form a one dimensional array that is perpendicular to a one dimensional array formed by the phased array receive elements.

Figure 1:
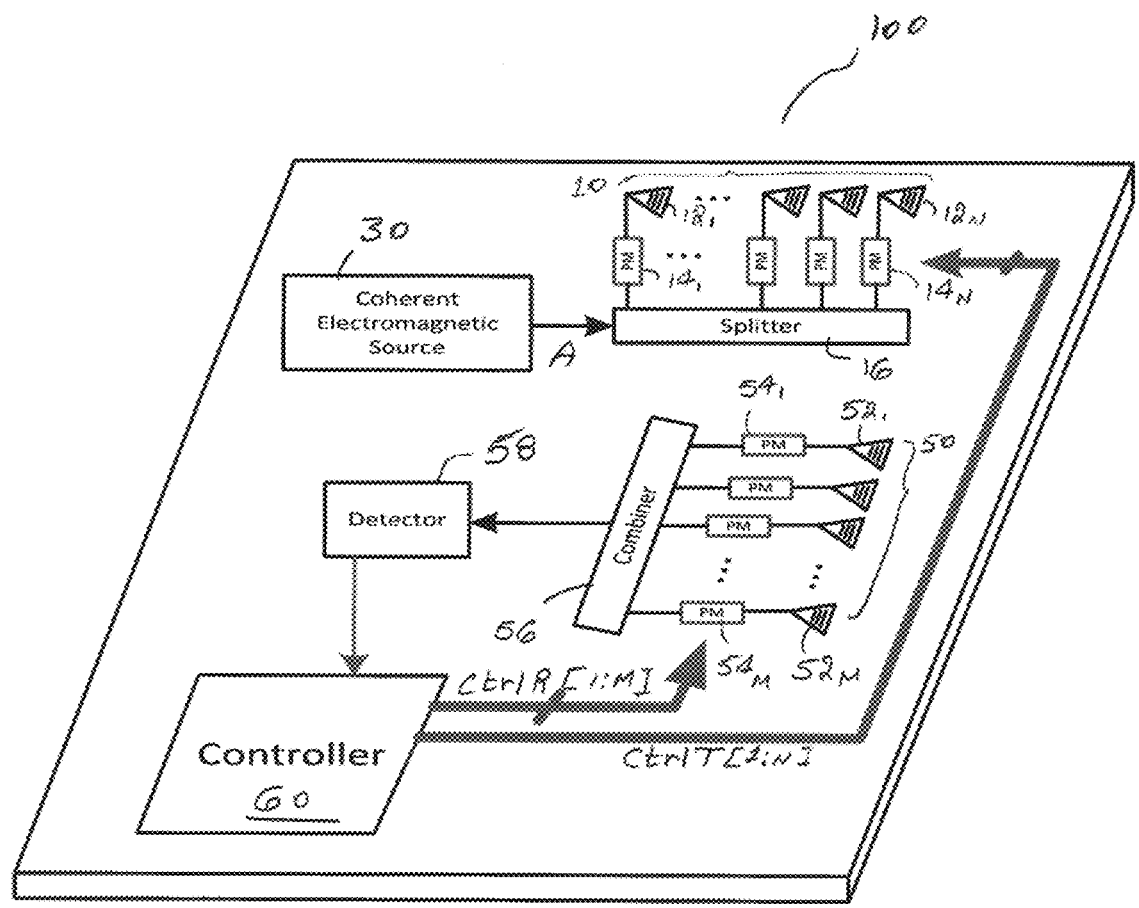
FIG. 1 is a simplified schematic diagram of an image capture device, in accordance with one exemplary embodiment of the present invention.

FIG. 1 is a simplified high-level block diagram of an image capture device 100, in accordance with one exemplary embodiment of the present invention. Image capture device 100 is shown as including, in part, a coherent optical signal source, e.g. a laser, 30, an optical splitter 16, optical phased array transmitter 10, an optical phased array receiver 50, a detector 58, and a controller 60.

Optical phased array transmitter 10 is shown as including N transmit antennas $12_1, 12_2 \ldots 12_N$, and N phase modulators $14_2 \ldots 14_N$. Optical signal A generated by coherent optical signal source 30 is received by and split by splitter 16 into N optical signals each delivered to a different one of the optical phase modulators $14_i$, where i is an index ranging from 1 to N. Each optical phase modulator $14_i$ is adapted to modulate the phase of the optical signal it receives, in accordance with the control signal $CtrlT_i$ that the phase modulator receives from controller 60, and delivers the phase-modulated optical signal to its associated optical transmit antenna element $12_i$. By varying (modulating) the relative phases of the optical signals transmitted by antenna elements $12_i$, the optical signal generated as a result of the interference of the N transmitted optical signals may be steered or rotated, as described further below.

Figures 2A, 2B:
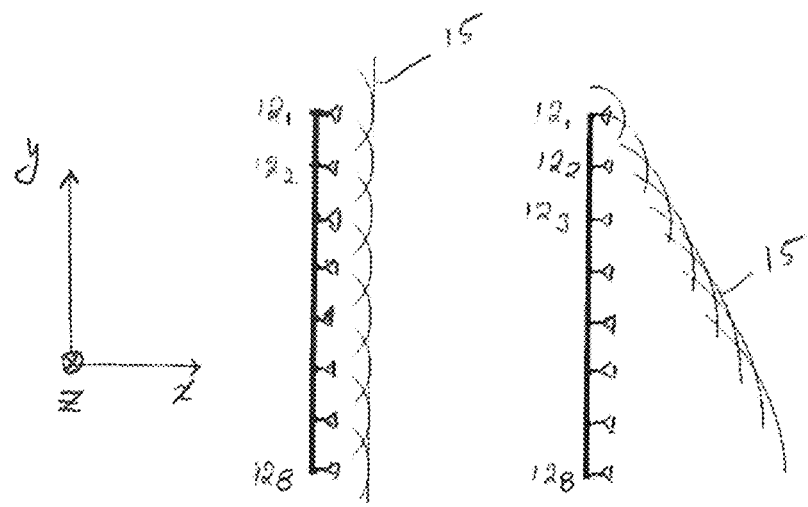
FIG. 2A shows a one dimensional array of transmit antenna elements transmitting optical signals having the same phase.
FIG. 2B shows a one dimensional array of transmit antenna elements transmitting optical signals having different phases.

FIG. 2A shows a one dimensional array of 8 transmit antenna elements $12_1, 12_2 \ldots 12_8$, positioned along the y-axis and transmitting signals having the same phase. Accordingly, the wavefront 15 of the resulting interference signal is substantially parallel to the y-z plane (z is perpendicular to the page). FIG. 2B shows the same wavefront 15 when the difference between phases of optical signals transmitted by antenna elements $12_j$ and $12_{j+1}$ (j is an index varying from 1 to 7 in this example) is selected to be equal to θ.

Figure 2C:
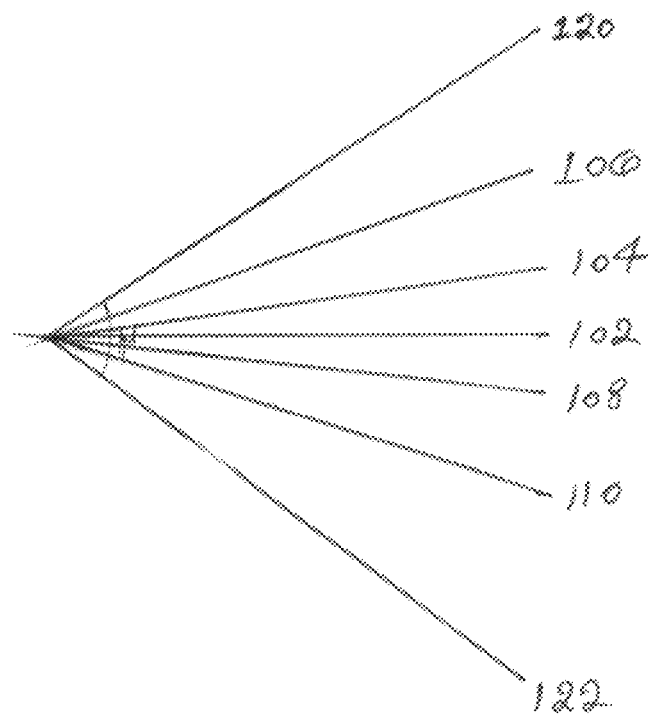
FIG. 2C shows an exemplary sweep angle of the optical signal transmitted by the optical phased array transmitter disposed in the image capture device of FIG. 1.
Figure 2D:
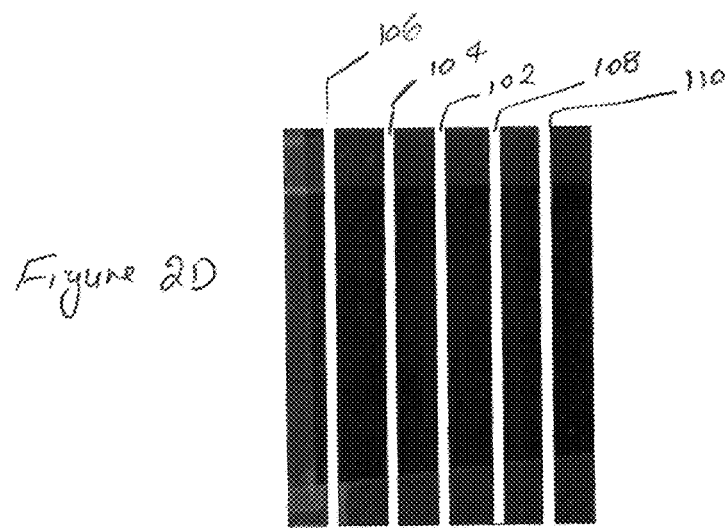
FIG. 2D shows exemplary directions along which an optical signal may be transmitted by the optical phased array transmitter disposed in the image capture device of FIG. 1.

As is seen from FIGS. 2A and 2B, by varying the relative phases of the transmit antenna elements, the direction of the resulting wavefront 15 may be varied. FIG. 2C shows the angle μ that the resulting signal 15 generated by antenna elements of FIG. 2A or 2B may cover. In other words, by varying the relative phases of the signals transmitted by antenna elements $12_1, 12_2 \ldots 12_8$, the resulting signal may be steered from direction 120 to 122 covering angel μ. FIGS. 2C and 2D are side and front views of the resulting optical signal along exemplary directions 106, 104, 102, 108 and 110 within the angle μ.

In a similar manner, the direction (angle) of the optical signal generated by phased array transmitter 10 of FIG. 1 may be varied by varying the relative phases generated by phase modulators $14_i$. The optical signal so transmitted is reflected off an object (not shown) whose image is being captured by optical phased array receiver 50 disposed in device 100. Optical phased array receiver 50 is shown as including M receiving antenna elements $52_1, 52_2 \ldots 52_M$, and M phase modulators $54_2 \ldots 54_N$. The one dimensional phased array receive antenna elements $52_1, 52_2 \ldots 52_M$ are positioned along the z-axis so as to be substantially perpendicular to the y-axis along which the one dimensional phased array transmit antenna elements $12_1, 12_2 \ldots 12_M$ are disposed. In other words, receive antenna elements $52_1, 52_2 \ldots 52_M$ are positioned in parallel to optical signal lines 106, 104, 102, 108 and 110 shown in FIG. 2D.

Figure 2E:
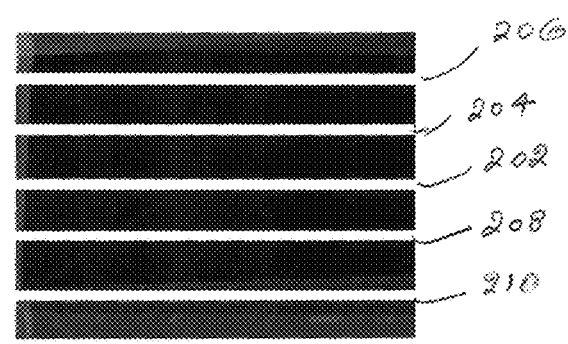
FIG. 2E shows exemplary directions along which an optical signal may be detected by the optical phased array receiver disposed in the image capture device of FIG. 1.
Figure 2F:
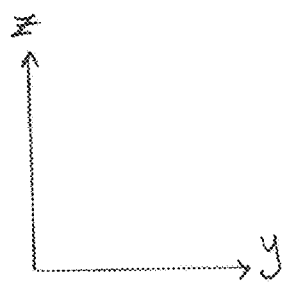
FIG. 2F shows the points of interceptions of the transmit and detect directions shown in FIGS. 2D and 2E.
Figure 2F:
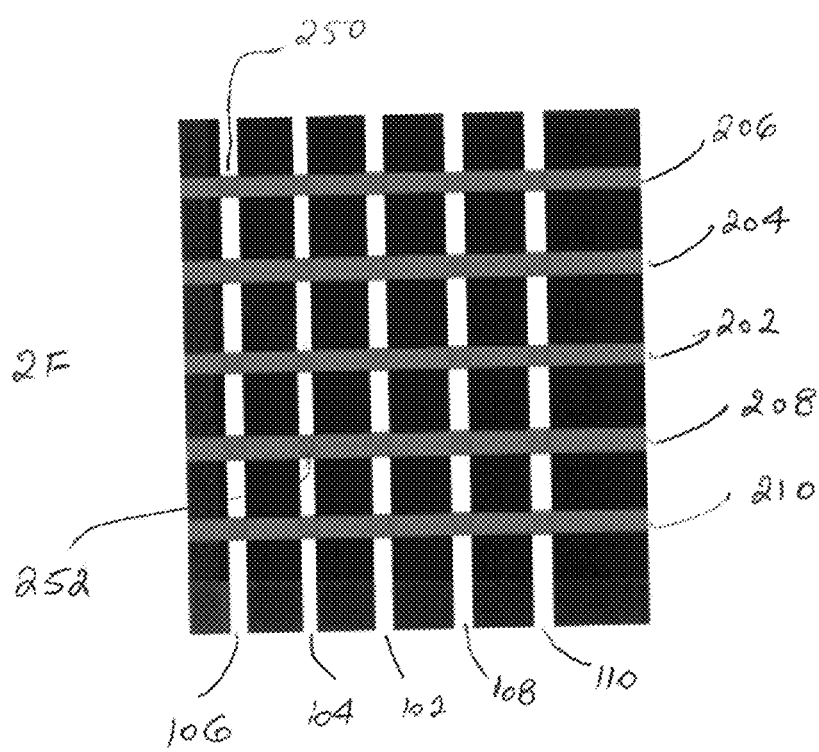

Because in the exemplary embodiment shown in FIG. 1, the receive antenna elements $52_k$ (k is an index ranging from 1 to M) are positioned in a direction that is perpendicular to the direction of the transmit antenna elements $12_i$ (shown along the z-axis in this example) by changing their relative phases via phase modulators $54_k$, the receive antenna elements $52_k$ may be configured to detect the optical signal reflected off the object along the direction perpendicular to the direction of the optical signal lines 106, 104, 102, 108, 110, i.e., along the y-axis shown in FIGS. 2D, 2E and 2F.

FIG. 2E shows exemplary directions 206, 204, 202, 208 and 210 along which receive antenna elements $52_k$ may be configured to detect an optical signal. In other words, by varying the relative phases of receive antenna elements $52_k$, optical phased array receiver 50 may be configured to scan and detect an optical signal along the y-axis as shown in FIG. 2E.

Because phased array transmitter 10 is configured to transmit and sweep optical signals along the z-axis and phased array receiver 50 is configured to scan and detect optical signals along the y-axis, as shown in FIGS. 2D, 2E, and 2F, phased array receiver 50 is enabled to detect an optical signal when the optical signal falls within the scan range of optical phased array receiver 50. For example, if controller 60, via phase modulators $14_i$, selects the relative phases of transmit antenna elements $12_i$ so that the transmitted optical is along direction 106 (see FIGS. 2D, 2E, and 2F), phased array receiver 50 may detect this signal at 250 when controller 60, via phase modulators $54_i$, selects the relative phases of receive antenna elements $52_i$ to look for the optical signal along direction 206. Similarly, for example, if controller 60, via phase modulators $14_i$, selects the relative phases of transmit antenna elements $12_i$ so that the transmitted optical is along direction 104, phased array receiver 50 may detect this signal at 252 when controller 60, via phase modulators $54_i$, selects the relative phases of receive antenna elements $52_i$ to look for the optical signal along direction 208.

Accordingly, an optical signal transmitted by transmitter array 10 is detected by receiver array 50 whenever the transmit direction of transmit array 10 and receive or search direction of receive array 50 intercept one another. FIG. 2F shows 25 such interceptions 2 of which are identified using reference numbers 250 and 252. In other words, to form an image of an object, controller 56 adjusts the phases of phase modulators $12_i$ so as to direct the optical signal via the phased array transmitter to a region of the object whose image is being captured. The controller then varies the phases of phase modulators $54_i$ and determines the amount of power it receives from the phased array receiver for each such phases. If the received power for any such phases is above a predefined threshold value, an image is identified as being detected, thereby causing the controller to move to the next region of the object.

Referring to FIG. 1, combiner 56 is adapted to combine the M received optical signals and deliver the combined signal to controller 60 via signal detector 58. In addition to controlling the phases of phase modulators $14_i$ and $54_j$, controller 60 may be further configured to store the positions of the detected signals, thereby to from a 3-dimensional image of the object. In some embodiments the number of transmit antenna elements in phased array transmitter, i.e. i, is equal to the number of receive antenna elements, i.e., j. Controller 60 may be configured to perform signal processing operations to capture and form a 3D image of an object. Such signal processing operations mat be similar to those used in pulsed LIDAR for depth measurement.

As described above, a device in accordance with embodiments of the present invention is adapted to capture and form an image of an object when the far field Fourier Transform patterns of the device's phased array transmitter and the device's phased array receive interest one another at only one point. FIG. 3A-3F shows a multitude of exemplary arrangements of the transmit and receive elements respectively of the phased array transmitter and receiver, in accordance with embodiments of the present invention.

Figure 3A:
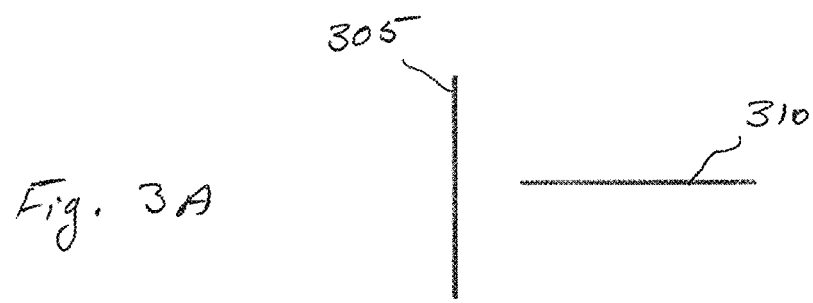
FIGS. 3A-3E show various arrangements of phased array transmitters and receivers disposed in an image captured device, in accordance with some embodiments of the present invention.
Figure 3B:
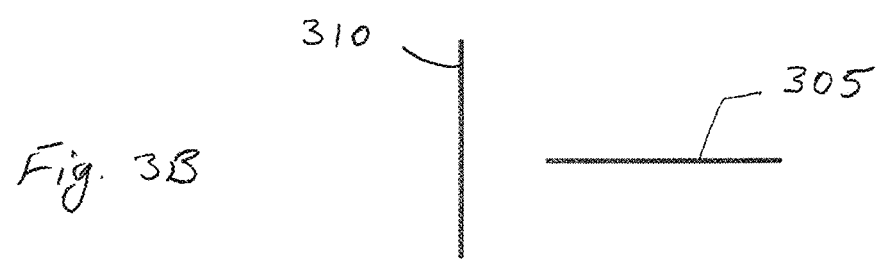
Figure 3C:
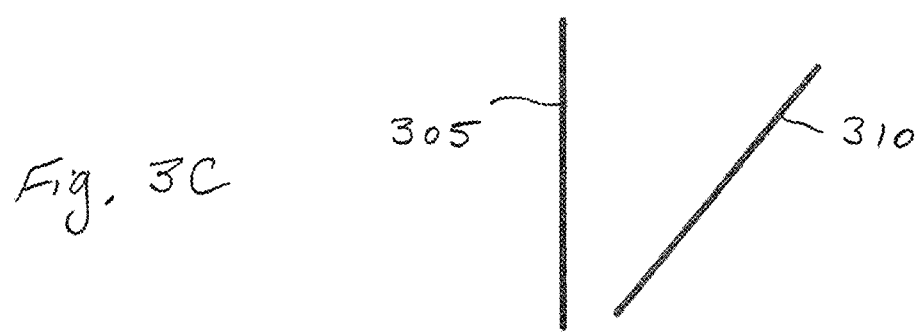
Figure 3D:
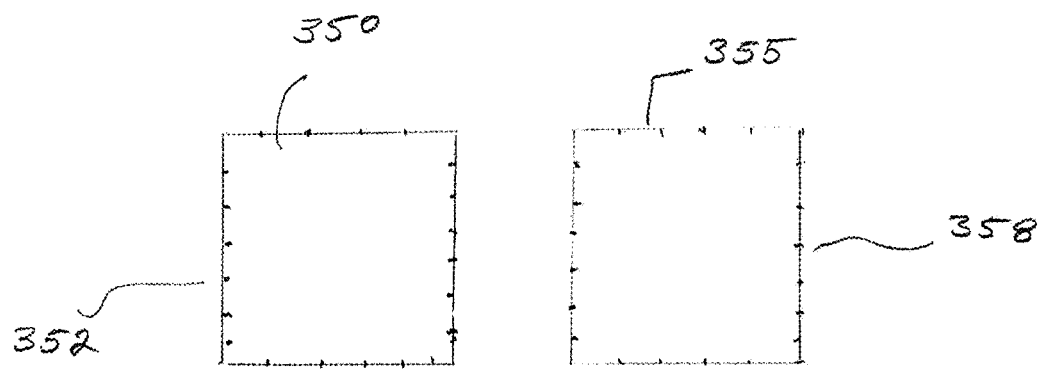

In FIG. 3A, the transmit antennas of the phased array are positioned along direction 305, and the receive antennas of the phased array are positioned along direction 310 which is perpendicular to direction 305. In FIG. 3B, the transmit antennas of the phased array are positioned along direction 305, and the receive antennas of the phased array are positioned along direction 310 which is perpendicular to direction 305. In FIG. 3C, the transmit antennas of the phased array are positioned along direction 305, and the receive antennas of the phased array are positioned along direction 310. The angel between directions 305 and 310 may have any value other than zero The array of transmit and receive elements of an image capture device, in accordance with embodiments of the present invention, may be two or three dimensional arrays. FIG. 3D shows a two-dimensional array of transmit antennas 352 and receive antennas 354 of an image capture device, in accordance with another embodiments of the present invention. Transmit antennas 352 are shown as being positioned along the periphery of rectangular region 350. Receive antennas 358 are shown as being positioned along the periphery of rectangular region 355. The two rectangular regions 350 and 355 are substantially in the same plane.

Figure 3E:
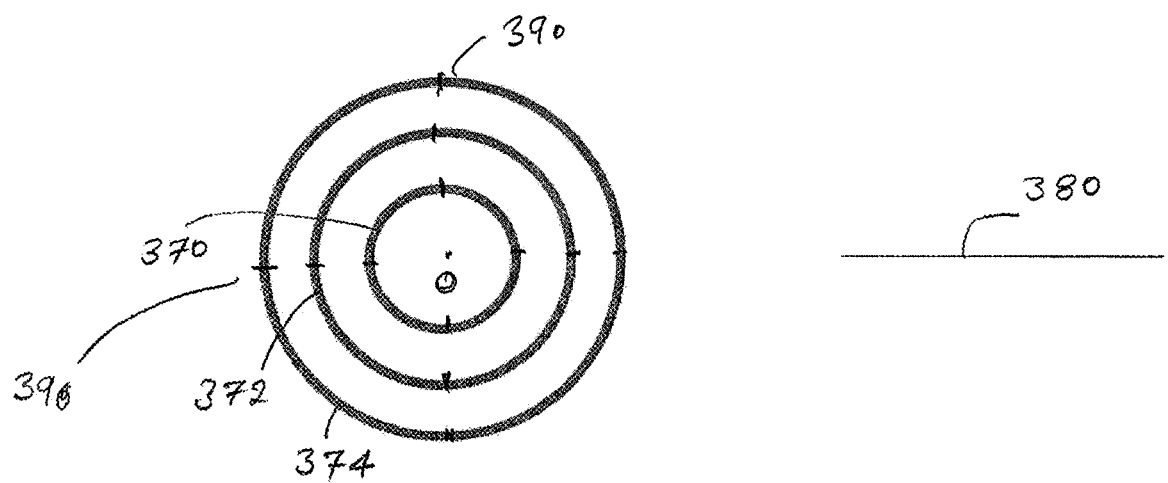

FIG. 3E shows the arrangement of arrays of transmit and receive antennas of an image capture device, in accordance with yet another embodiment of the present invention. The transmit antennas 390 are assumed to be positioned along the circumference(s) of one or more concentric circles 370, 372 and 374. The receive antennas may be positioned along line 380 poisoned in the same plane as that in which the concentric circles are positioned. It is understood that in FIGS. 3A-3E other elements of an image capture device, such as phase modulators (see, for example, FIGS. 1 and 4) are not shown. It is also understood that the one dimensional arrays shown in FIGS. 3A-3C and the two-dimensional arrays shown in FIGS. 3D and 3E may have any number of transmit and receive antennas.

Figure 4:
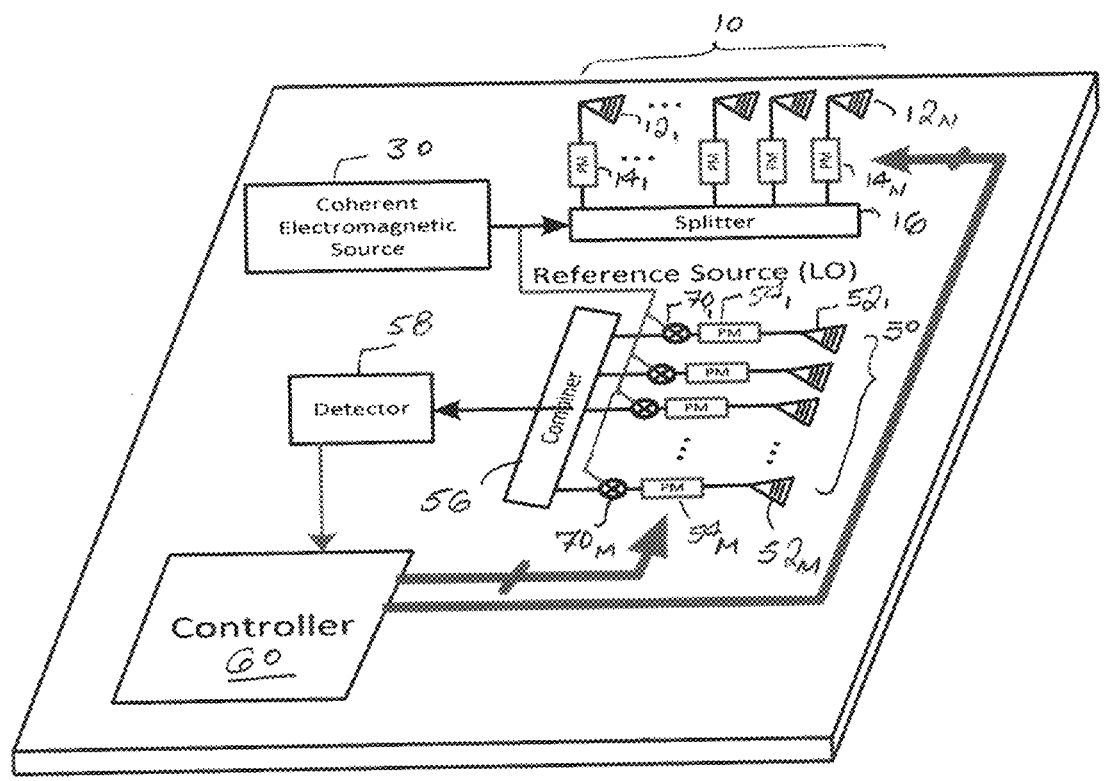
FIG. 4 is a simplified schematic diagram of an image capture device, in accordance with one exemplary embodiment of the present invention.

FIG. 4 is a simplified schematic diagram of an image capture device 300, in accordance with another exemplary embodiment of the present invention. Image capture device 300 is similar to image capture device 100 except that image capture device 300 also includes M mixers $70_j$ each associated with a different one of the receive antenna elements $52_j$. For example, mixer $70_1$ converts the frequency of the signal received by antenna element $52_1$ and delivers the frequency converted signal to combiner 56. Similarly, mixer $70_M$ converts the frequency of the signal received by antenna element 52M and delivers the frequency converted signal to combiner 56. Mixer $70_j$ are adapted to simplify the measurement process by shaping and reducing the noise in the system. Accordingly device 300 has a relatively higher sensitivity and accuracy. Image capture device 300 may be used with, for example, with pulsed LIDAR or other techniques that use linear frequency modulation.

The above embodiments of the present invention are illustrative and not limitative. Embodiments of the present invention are not limited by the number of transmit or receive antennas, the wavelength of the optical source, the type of frequency conversion, the type of optical signal splitter, combiner, and the like. Embodiments of the present invention are not limited by the type of substrate, semiconductor or otherwise, in which various optical and electrical components of the image capture device are formed. Other additions, subtractions or modifications are obvious in view of the present disclosure and are intended to fall within the scope of the appended claims.

What is claimed is:

1. An image capture device comprising:
   N optical transmit antennas forming a first array, wherein N is an integer;
   N phase modulators each associated with and adapted to control a phase of a different one of the transmit antennas;
   M optical receive antennas forming a second array, wherein M is an integer;
   M phase modulators each associated with and adapted to control a phase of a different one of the receive antennas;
   a controller adapted to control phases of the first and second plurality of phase modulators to capture an image of an object;
   an optical splitter adapted to split a received coherent optical signal into N optical signals and deliver the N optical signals to the N phase modulators;
   an optical signal combiner adapted to combine M optical signals received from M receive antennas to generate a combined received optical signal; and
   a detector adapted to detect whether the combined received optical signal represents an image of one or more points of the object.

2. The image capture device of claim 1 wherein said detector is adapted to supply its output to the controller.

3. The image capture device of claim 2 wherein said coherent optical signal is supplied by a laser.

4. The image capture device of claim 1 further comprising:
   M mixers disposed between the M transmit antennas and the combiner.

5. The image capture device of claim 1 wherein said M is equal to said N.

6. The image capture device of claim 4 wherein said coherent optical signal supplies a reference signal to the M mixers.

7. The image capture device of claim 1 wherein said first and second arrays are one-dimensional arrays positioned substantially orthogonal to one another.

8. The image capture device of claim 1 wherein said first array forms a circular array of transmitters, and said second array forms a one-dimensional array of receivers positioned substantially orthogonal to a plane of the circular array of the transmitters.

9. A method of forming an image of an object, the method comprising:
   transmitting to the object N optical signals from N transmit antennas positioned along a first array;

modulating phases of the N transmit antennas via a first N phase modulators and in accordance with a first control information received from a controller;

receiving reflection of the N optical signals off the object via M optical receive antennas forming a second array;

modulating phases of the M optical receive antennas via a second M phase modulators and in accordance with a second control information received from the controller;

splitting a coherent optical signal received from an optical source into N optical signals;

delivering the N optical signals to the N phase modulators;

combining the M optical signals received from the M receive antennas to generate a combined received optical signal; and detecting whether the combined received optical signal represents an image of one or more points of the object.

10. The method of claim 9 further comprising:

supplying to the controller a signal representative of whether the combined received optical signal represents an image of one or more points of the object.

11. The method of claim 9 wherein said coherent optical signal is supplied by a laser.

12. The method of claim 9 further comprising:

converting a frequency of M optical signals received by the M receive antennas.

13. The method of claim 9 wherein said M is equal to said N.

14. The method of claim 9 further comprising:

converting the frequency of M optical signals in accordance with a reference signal supplied by the coherent optical signal.

15. The image capture device of claim 7 wherein said first and second arrays are one-dimensional arrays positioned substantially orthogonal to one another.

16. The image capture device of claim 7 wherein said first array forms a circular array of transmitters, and said second array is a one-dimensional array, wherein said circular array and said one-dimensional array are disposed substantially in a same plane.

* * * * *